No. 635,321. Patented Oct. 24, 1899.
J. B. HILL.
CUTTING BAR FOR MOWING MACHINES.
(Application filed May 1, 1899.)
(No Model.)

Witnesses:
William D. Roberts

John B. Hill, Inventor
By Marion & Marion
Attorneys

UNITED STATES PATENT OFFICE.

JOHN B. HILL, OF WINCHESTER, CANADA.

CUTTING-BAR FOR MOWING-MACHINES.

SPECIFICATION forming part of Letters Patent No. 635,321, dated October 24, 1899.

Application filed May 1, 1899. Serial No. 715,109. (No model.)

*To all whom it may concern:*

Be it known that I, JOHN B. HILL, a subject of Her Majesty the Queen of Great Britain, residing at Winchester, county of Dundas, Province of Ontario, Canada, have invented certain new and useful Improvements in Cutting-Bars for Mowing-Machines; and I do hereby declare that the following is a full, clear, and exact description of the invention, such as will enable others skilled in the art to which it appertains to make and use the same.

This invention relates to cutter-bars for mowing and reaping machines; and its object is to provide a cutter-bar for such machines which is simple in construction, of more than ordinary strength, effective in operation, and can be manufactured at a low cost.

A further object is to provide an improved means for securing the removable cutter-knives to the cutter-bar which is simple in construction, effective in use, and whereby the said cutter-knives may be easily and quickly secured to the cutter-bar and removed therefrom when it becomes necessary to sharpen or replace the said knives.

To these ends the invention consists in an improved cutter-bar and means for removably securing the cutter-knives thereto, substantially as hereinafter illustrated, and described and defined in the appended claim.

Figure 1:
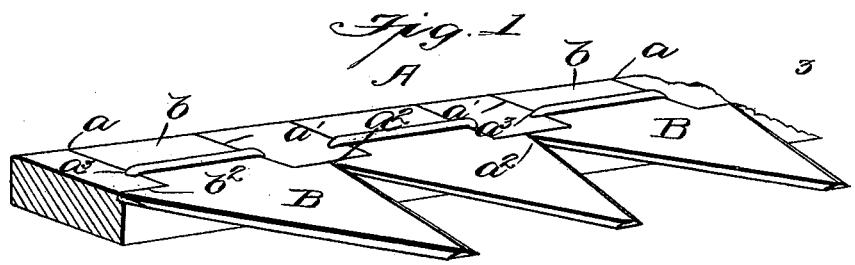
Figure 2:
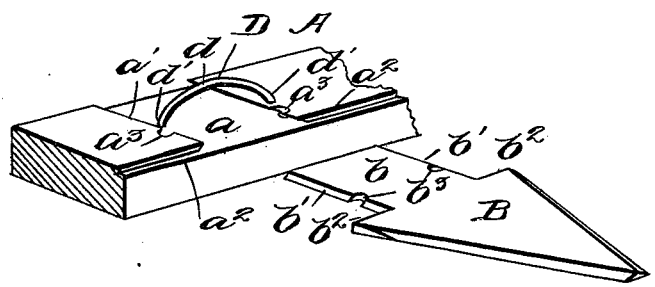
Figure 3:
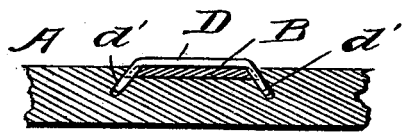

Referring to the drawings, in which similar letters of reference refer to similar parts, Figure 1 illustrates in perspective the improved cutter-bar with the knives in operative position. Fig. 2 is a view in perspective of a fragment of the cutter-bar with one of the cutter-knives detached, showing the details of construction whereby the knife is removably secured in position. Fig. 3 is a section taken on the line 3 3 of Fig. 1.

In the drawings, A represents a fragment of the cutter-bar of a mowing-machine, which cutter-bar may be of any ordinary or preferred form. The upper surface is provided with a series of transverse recesses $a$, the edges $a'$ of which are undercut, as shown in Fig. 2. The front edge of the cutter-bar is also cut away along its entire length, forming undercut recesses $a^2$, extending on each side of the slot $a$. Each edge $a'$ of the recesses $a$ is provided with inclined perforations $a^3$, the said perforations extending down into the cutter-bar.

The cutter-knives B are of any ordinary or preferred construction and are provided with the usual shank or tang $b$, the edges $b'$ of which are suitably undercut or beveled to correspond with and closely fit the undercut edges $a'$ of the recesses $a$, formed in the cutter-bar A. The rear edges $b^2$ of the knife B are also undercut or beveled to correspond with the recesses $a^2$, in which they are adapted to fit. A semicircular groove $b^3$ is formed on each of the edges $b'$ of the shank $b$ and so located as to be in alinement with the perforations $a^3$, formed in the cutter-bar A.

The locking rod or bar D is formed of any suitable material and is slightly bowed or curved at its central portion $d$, and the ends $d'$ of said bar D are bent downwardly at an angle to permit them to enter the inclined perforations $a^3$ of the cutter-bar A, as shown in Fig. 3.

The parts are assembled by slipping the shank of the knife into the recess formed in the cutter-bar until the rear edges of the knife fit closely with the recesses $a^2$ and the grooves $b^3$ are in alinement with the perforations $a^3$. The locking-bar D is then applied and its ends driven into the perforations $a^3$. It will thus be seen that I have provided a strong, simple, and effective means for locking the knives to the cutter-bar without diminishing the strength of said bar by boring rivet-holes therethrough, as in the ordinary construction. The knives may be readily removed by inserting the end of a cold-chisel or other suitable tool beneath the locking-rod and prying the same out of the perforations in the cutter-bar.

While I have herein shown a preferred form of carrying my invention into effect, yet I do not desire to limit myself to such preferred details of construction, but claim the right to use any and all modifications thereof which will serve to carry into effect the objects to be attained by this invention in so far as such modifications and changes may fall within the spirit and scope of my said invention.

I claim—

The combination with a cutter-bar provided with a recess having undercut side edges and inclined perforations formed in said side edges, of a knife having a shank adapted to be removably mounted in said recess, beveled edges formed upon the rear of said knife and the sides of said shank, corresponding with the undercut edges of said recess, the edges of the said shank being provided with grooves corresponding with the perforations of said recess, and a locking-bar adapted to be driven into the perforations and grooves of the said recess and shank whereby said knife is removably secured to the cutter-bar, substantially as described.

In witness whereof I have hereunto set my hand in the presence of two witnesses.

JOHN B. HILL.

Witnesses:
S. S. REVELER,
A. W. BROCH.